Oct. 31, 1967  A. E. BERGQUIST  3,350,013
EMERGENCY TRACK
Filed Nov. 22, 1965

INVENTOR
ARTHUR E. BERGQUIST

BY
ATTORNEY

United States Patent Office 3,350,013
Patented Oct. 31, 1967

3,350,013
EMERGENCY TRACK
Arthur E. Bergquist, Lindstrom, Minn. 55045
Filed Nov. 22, 1965, Ser. No. 508,965
10 Claims. (Cl. 238—14)

ABSTRACT OF THE DISCLOSURE

The invention relates to an emergency track useful in getting a vehicle out of snow, ice or mud. It comprises a series of inverted channels connected in spaced parallel relation by an address cable which extends through slots near opposite ends of the channels, and is preferably anchored by bolts offset from the slots to bend the portions of the cable between the slots into V-shaped form. Preferably a second channel is anchored in base-to-base relation with the inverted channel to provide transverse tire engaging cleats. A cleated ramp may be provided at the end of the cleats.

---

This application relates to a portable track to enable vehicles to obtain traction.

Automobiles and other wheeled vehicles have had a continuous problem throughout the years in becoming mired in mud, snow, sand, or ice, and in other ways. With most automotive vehicles, only one of the rear wheels drives. Consequently, if one of the rear wheels is unable to obtain traction, the vehicle is in difficulty. Since the way in which such wheels are geared together is well known, it is not believed necessary to further describe the problem.

There have been several attempts throughout the years to arrive at ways of alleviating the problem. Some of these consists of various types of traction mats and others consists of items such as sand bags, salt bags and similar items. While all of these have some advantages, none have proven particularly successful. One type of devices has success in use with ice and is worthless with sand. Another device is fine on firm sand but is worthless in mud.

It is an object of the present invention to provide a portable track which can be used regardless of whether the vehicle is stuck in snow, in mud, in sand, on ice, etc.

Although many attempts have been made to provide a series of tracks hooked together none of these have been particularly successful because of various difficulties.

Accordingly, each invention would have some immediate sales enjoyment, and then fall into disregard as its disadvantages became apparent.

It is an object of the present invention to provide a portable track which may be used advantageously throughout the year whenever a vehicle becomes mired. Further, it is an object to provide a device which may be readily stored or carried within the automobile trunk and be available for immediate use.

It is a further object of the present invention to provide a portable track which is inexpensive and available at low cost.

It is a further object of the present invention to provide a portable track which is free from maintenance difficulties.

To accomplish my purposes I provide a series of generally U-shaped tracks which in their inverted position of use have downwardly and outwardly disposed sides or legs. A centrally located pivotal member is provided between the legs, the pivotal member being of a length in extension greater than that of the legs. Accordingly, each track will tend to pivot toward the engaging tire as the tire rides upwardly onto the track, then to level when the tire is immediately above the track, and to tilt forwardly when the tire moves on toward the next track in the series. The pivotal member serves to enable the track to tilt to provide the desired sloping surface so that the tire may easily ride on to the track.

In the usual construction each track has flanges or ridges extending upwardly from the upper surface of the track which serve to engage in the tire threads to enable the tire to be pulled onto the track. A continuous cable extends through registered apertures adjacent the ends of the tracks, the tracks being secured in spaced relation on the cable, and the cable extending continuously from the rear track through the front track and thence backwardly to the rear track where it is secured. By this arrangement, the tracks are enabled to move relative to each other, but the entire track cannot be dislodged and cast to one side as is common with other track devices.

To enable the vehicle to readily mount the portable track, I provide a ramp member which is in pivotal relation to the first track. The ramp is so structed as to be capable of being inserted beneath the tire so as to permit ready engagement of the tire upon it, and to provide the necessary incline so as to raise the tire in movement onto the first track.

It is obvious, therefore, that I have provided a unique means of freeing mired wheels. Additionally, the tracks have the advantage of being free from the usual side movement.

It is therefore an object of the present invention to provide a portable track having a ramp to engage the wheel to permit the wheel to rise on the accompanying track members while at the same time resisting side movement.

These and other objects and particular advantages will be more particularly described in detail when taken in conjunction with the accompanying drawings in which.

Figure 1:
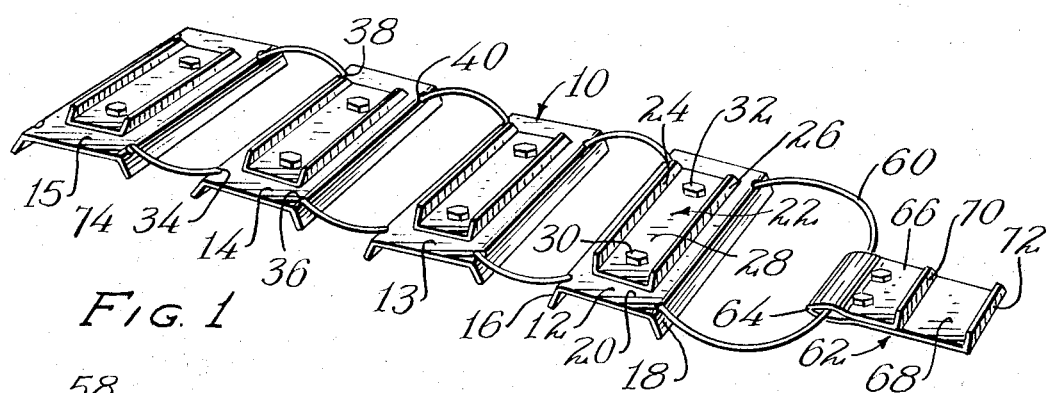
FIGURE 1 is a perspective view of my portable track.

FIGURE 1 discloses a portable track generally number 10 which is illustrative of my invention. The track 10 shown in FIGURE 1 is comprised of a series of generally U-shaped plates or channels 12 which are similar in structure and consequently comprise generally identical parts. For ease of description, the channels are numbered 12, 13, 14 and 15.

Each channel comprises a pair of outwardly angled legs or sides 16 and 18 joined to an intermediate web 20 to form the channel plate. The legs are outwardly angled from the web 20 for a purpose which will be subsequently described.

To the upper surface of the plate 12 is secured an outstanding flange such as 22.

In the preferred construction the flange 22 consists of a pair of generally upright abutments 24 and 26 connected by an intermediate web 28. The abutments 24 and 26 are in generally parallel outstanding relation so that the flange 22 is essentially an upturned U-shaped member.

The flange 22 is secured to the channel 12 by any suitable means of securing such as by welding or other fastening means. In the construction illustrated the flange 22 is secured to the channel 12 by a pair of stud bolts 30 and 32 which extend through registered apertures in the flange and channel (not shown) intermediate the leg 16 and 18 as may be more clearly seen in FIGURES 3 and 4.

Each track member or channels has spacedly opposed apertures or slots such as 34 and 36 and 38 and 40, these slots extending through the channels at a point closely approximating the bend line where the legs join the web.

Figure 2:
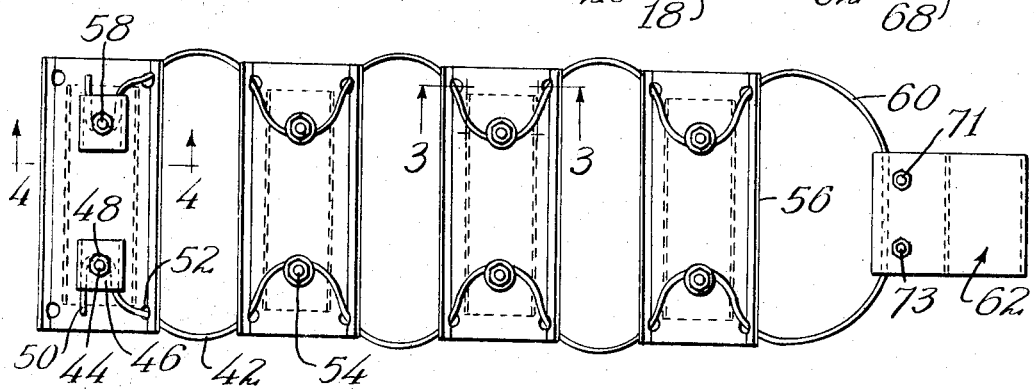
FIGURE 2 is a bottom plan view of my portable track showing the individual tracks in secured relation to the continuous cable.

Turning to FIGURE 2 it can be seen that there extends through the registered spacedly opposed apertures a continuous flexible cable. The cable 42 is secured to the pivot member such as the bolt 44 by means of a keeper 46 and a locking member 48 such as a nut. Obviously, it would be possible to use any of several mechanical devices to hold the end 50 of the cable 42 in secured relation to the undersurface of the channel in the described position. The cable extends from the last track through the aperture 52 and onward into the next track where the cable is again secured in the manner described to the pivot member 54. As the cable is let through the forward end 56 of the front track channel, it is counter-turned and extended rearwardly through similarly spaced and registered apertures in each channel until it reaches the last track where it is secured to the stud 58 in a manner previously described.

To the counter-turned portion of the cable as indicated at 60 in the preferred construction, there is secured a ramp member generally numbered 62. The ramp member in preferred construction comprises a plate which is counter-turned upon itself as indicated at 64 so as to have overlying plate portions 66 and 68. The upper portion 66 is preferably shorter than the lower portion 68. The leading ends 70 and 72 are upturned at generally right angles to their corresponding plate portions to provide tire engaging ledges.

It is obvious that the ramp is secured to the counter-turned cable end 60 by clamping of the ramp at the point of counter-turning and by studs 71 and 73.

Preferably the ramp end channels are made of a sturdy metal which will not crush or distort under the weight of the vehicle. Obviously, the gauge of the metal can be varied so that the track can be built strongly enough to accommodate large tractors as well as the smallest compact cars. However, it is believed that such would be obvious.

In the preferred construction the cable is a highly flexible metallic cable preferably enclosed in a sheet of covering material such as plastic to resist corrosion and wear on the cable itself. Again, both the cables and channels can be treated to prevent corrosion and this is also believed to be obvious.

As may be seen in FIGURE 1, the corners of the legs such as is indicated at 74 are right angles. This is because the channels would otherwise tend to move toward one side or the other under the pressure of the automobile wheel. By providing the square cornered structure, the channels tends to dig into the ground or other surface and to resist sideward movement.

Figure 3:
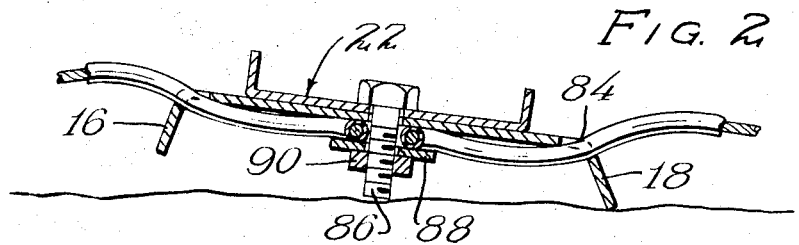
FIGURE 3 is a cross-section of a track taken along the line 3—3 of FIGURE 2 showing both the particular structure of the track and the relationship of the pivot member.
Figure 4:
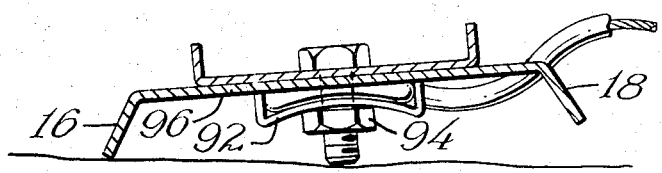
FIGURE 4 is a section taken along the lines 4—4 of FIGURE 2 showing the relation of the upper flange to the downwardly disposed channel.

As may be seen in FIGURES 3 and 4 the pivot member enables the channels to pivot up and down as the wheel passes over it. As the wheels commences to ride up onto the flange, the leg of the channel closest to the wheel is urged downwardly into contact with the ground or snow or other material in which it is in contact. This urging downwardly causes the leg to engage the ground and to resist forward or rearwad movement as the wheel turns. When the wheel is centered on the channel, then the pivot is urged directly into the ground or other surface, and as the wheel passes onward the other leg 16 is urged downwardly into engagement with the ground. The pivot member is of a length to extend beyond the ends of the legs 16 and 18 to provide not only the pivotal action but engagement with the ground or other surface as well. Thus, the pivot member serves to hold the channel in stationary position during the passage of the wheel and further serves as the fulcrum for pivoting of the channel so that the legs may engage the ground and additionally to permit the tire to more easily ride up onto the flange members and onto the next channel.

My comparison of the views of FIGURE 3 and FIGURE 4 the pivoting engagement of the legs with the ground surface can be clearly seen.

Figure 5:
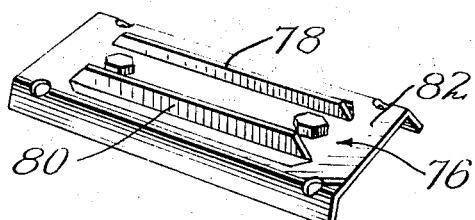
FIGURE 5 is a perspective view of a modification of a track member particularly showing another form of flange structure.

FIGURE 5 discloses a modification of the structure in which the channel 76 has a plurality of flanges 78 and 80 secured to the upper surface 82 of the channel 76. The securing of the flanges 78 and 80 may be by any convenient means such as welding for example.

It is obvious that the pivot member may comprise a single continuous abutment extending downwardly from the lower surface of the channel or may comprise the full arrangement shown. In either event, the pivot member will function in the same manner as previously described.

One of the obvious advantages of the track is that the track may be readily rolled up and stored without the problem of the cables becoming entangled. This is a particular advantage in that a small amount of space is needed for storage or for shipping of the particular tracks. Additionally, it is an advantage in that the length of the track may be substantially increased should such be necessary by the addition of similar channels and the length in cable.

As may be seen in FIGURE 2 and in FIGURE 1, when a vehicle would engage a wheel upon the ramp travelling in a forward to back movement, the studs 71 and 73 will tend to engage the ground slightly. However, the main purpose of the ramp is to enable the tire to move forwardly onto the first track. Accordingly, the ramp will pivot readily on its cable connection and the abutments 70 and 72 will readily engage the tire. As the tire passes forward the pull is for the entire length of the track as the cable is one continuous piece. Accordingly, the usual tendency of objects beneath the wheels to be thrown either rearwardly or laterally is overcome as the channel corners engage the surface to prevent lateral movement and the leg engages the ground to prevent forward or backward movement. Additionally, the pivot member serves to permit the channel to pivot so as to enable the tire to more readily pass over it in engagement.

The inventor has pursued a particular exhausting series of tests to arrive at a structure which would accomplish his purpose. For example, various models were tested by the State Highway Patrol in arriving at the functional structure presented in this application. It has been found that the device is particularly successful and meets a desired level not only of utility but of economy thereby making it a convenient item for the vehicle owner.

Returning again to the arrangement described, the flexible cable enables each track to be somewhat independent of the other track, but to adjust because of the relatively flexible cable which connects adjacent tracks.

It is recognized that some obvious modifications in manufacture can be accomplished. For example, the inventor has utilized a one piece channel having its legs folded in counter-turn fashion over the top of the plate so as to have the terminal edges provide the flange members. Similarly, a one piece pivotal member has been considered. However, it is believed that the structure portrayed brings out the particular functions of the track and the purpose of the structure as well, and accordingly the modifications thereof are believed to be quite obvious.

The method of securing the cable to the individual posts can be quite clearly seen in FIGURES 3 and 4. The cable passes through the aperture along the form line 84 inwardly through the stud 86 where it is secured by means of a retainer such as the washer 88 and the lock nut 90. This has a particular advantage in that the cable is not only firmly secured, but in addition each track tends to follow the preceding track toward the direction of tire engagement. This is obviously a uniqnue advantage which the inventor has found to be extremely successful.

FIGURE 4 illustrates a U-shaped clamp 92 which is used preferably in securing the ends of the cable to the rear track. A lock nut 94 is provided to hold the U-clamp in engagement with the undersurface 96 of the channel illustrated. Additionally, an advantage of this particular assemblage is that the cable may be readily mounted on the rear track and the clamp tightened to hold it securely.

It will be obvious further that the pull of the cable in every instance is against the formed line predominantly and therefore the bolt or stud fixedly secures the cable quite easily.

In accordance with the Patent Office statutes, I have described the principles of construction and operation of my improvement in portable track, and while I have endeavored to set forth the best embodiment thereof, I desire to have it understood that obvious changes may be made within the scope of the accompanying claims without departing from the spirit of my invention.

I claim:
1. A portable traction device comprising:
 (a) a plurality of generally rectangular inverted U-shaped channels in spaced apart substantially parallel relation, and having the channel sides extending downwardly,
 (b) each said channel having opposed slots adjacent opposite ends of said channel sides,
 (c) abutment means offset inwardly from said opposed slots extending generally normal to said channel intermediate the channel sides,
 (d) flexible cable means extending through said opposed slots and fixedly secured to said abutment means to connect said channels.
2. The structure of claim 1 and in which said abutment means extends below the terminal edges of said channel sides to provide a pivot.
3. The structure of claim 2 and in which said abutment means includes a pair of studs in spaced relation longitudinally of said channel.
4. The structure of claim 1 and in which the sides of the channel extend downwardly and each channel has at least one elongated longitudinally extending rib secured to its upper surface intermediate said channel sides extending in a direction opposite said channel sides.
5. The structure of claim 1 and in which ramp means having upwardly extending tire engaging ledges thereon are pivotally secured to the first of said channels.
6. The structure of claim 5 and in which said cable means extends through a counterturned portion in said ramp means.
7. The structure of claim 1 and in which said cable means is a continuous cable.
8. The structure of claim 1 and in which each said channel has an elongated rib extending longitudinally of the upper surface of said channel,
 said abutment means extending beneath the terminal edges of said channel sides to provide a pivot,
 said channels being in fixed relation to said cable means and in movable relation to each other,
 whereby said channels are adapted to follow each other in advancing movement when engaged by the wheel of a vehicle.
9. A portable traction device comprising:
 (a) a plurality of inverted U-shaped channels in spaced apart parallel relation and having the channel sides extending downwardly,
 (b) a second channel having its base in face contact with the base of each said inverted channel and having its channel sides extending upwardly therefrom in parallel relation to the sides of the inverted channels,
 (c) flexible cable means connecting said inverted channels in spaced relation, and
  means holding said inverted channels and said second channels in base-to-base contact, and securing said flexible cables to said channels.
10. The structure of claim 9 and in which said holding means extend through the bases of said inverted channels.

References Cited

UNITED STATES PATENTS

| 1,291,116 | 1/1919 | Pinckney et al. | 152—227 |
| 1,375,666 | 4/1921 | Baver | 238—14 |
| 1,449,020 | 3/1923 | Teasley et al. | 238—14 |
| 3,190,336 | 6/1965 | Batori | 152—227 |

FOREIGN PATENTS 280,065  11/1927  Great Britain.

ARTHUR L. LA POINT, *Primary Examiner.*

R. A. BERTSCH, *Assistant Examiner.*